United States Patent
Falardeau

(10) Patent No.: US 6,684,321 B1
(45) Date of Patent: Jan. 27, 2004

(54) UNIFIED MEMORY ARCHITECTURE FOR USE BY A MAIN PROCESSOR AND AN EXTERNAL PROCESSOR AND METHOD OF OPERATION

(75) Inventor: Brian D. Falardeau, Boulder, CO (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 09/477,094

(22) Filed: Jan. 4, 2000

(51) Int. Cl.[7] .............................................. G06F 13/00
(52) U.S. Cl. ......................................... 712/29; 709/216
(58) Field of Search ............................. 712/29; 711/154, 711/165; 709/216

(56) References Cited

U.S. PATENT DOCUMENTS

| | | | | |
|---|---|---|---|---|
| 4,737,932 A | * | 4/1988 | Baba ........................... 710/107 |
| 5,467,461 A | * | 11/1995 | Nasu et al. ..................... 700/5 |
| 5,894,563 A | * | 4/1999 | Saperstein ................... 710/305 |
| 5,911,149 A | * | 6/1999 | Luan et al. .................. 711/147 |
| 6,088,046 A | * | 7/2000 | Larson et al. ................ 345/538 |
| 6,134,605 A | * | 10/2000 | Hudson et al. ................ 710/13 |
| 6,226,738 B1 | * | 5/2001 | Dowling ...................... 712/225 |

* cited by examiner

*Primary Examiner*—Eric Coleman
(74) *Attorney, Agent, or Firm*—Ingrassia Fisher & Lorenz, P.C.

(57) ABSTRACT

There is disclosed a processing system comprising: 1) a first data processor comprising a unified memory architecture for receiving memory access requests from an external bus coupled to the first data processor; 2) a memory coupled to the first data processor and controlled by the unified memory architecture, the memory storing a first plurality of instructions executable by the first data processor; and 3) a second data processor coupled to the external bus and capable of sending the memory access requests to the first data processor, wherein the memory access requests access data used by the second data processor stored in the memory.

22 Claims, 4 Drawing Sheets

UNIFIED MEMORY ARCHITECTURE FOR USE BY A MAIN PROCESSOR AND AN EXTERNAL PROCESSOR AND METHOD OF OPERATION

TECHNICAL FIELD OF THE INVENTION

The present invention is directed, in general, to processing systems and, more specifically, to a data processor implementing a unified memory architecture design that is accessible by external processor(s).

BACKGROUND OF THE INVENTION

The number of electronic systems which contain microprocessors continues to grow as the prices of microprocessors and memory continue to fall. Microprocessors are implemented not only in traditional desktop personal computers (PCs), but also in a wide variety of consumer electronic devices, including home appliances, and wireless communication devices. Increasingly, many of these systems contain more than one processor. For example, some PC designs contain a main central processing unit (CPU) and a second processor (or "coprocessor" or "peripheral processor") that performs a specific secondary function, such as a digital signal processor (DSP) that handles digital subscriber line (DSL) communications.

The use of more than one processor in a system, however, has numerous drawbacks. Not only does each additional processor increase the overall cost of, for example, a personal computer, but in conventional processing architectures, each additional processor requires its own memory and memory interface to store data and instructions used by that processor. This increases the overall chip count and pin count of the system and further increases the cost of the system.

Therefore, there is a need in the art for improved processing systems that minimize the cost and the complexity of multiprocessor systems. In particular, there is a need in the art for improved processing systems that minimize the amount of memory used in a processing system containing a main processor and at least one additional processor.

SUMMARY OF THE INVENTION

The limitations inherent in the prior art described above are overcome by an advantageous embodiment of the present invention, which provides a processing system comprising: 1) a first data processor comprising a unified memory architecture capable of receiving memory access requests from an external bus coupled to the first data processor; 2) a memory coupled to the first data processor and controlled by the unified memory architecture, the memory capable of storing a first plurality of instructions executable by the first data processor; and 3) a second data processor coupled to the external bus and capable of sending the memory access requests to the first data processor, wherein the memory access requests access data used by the second data processor stored in the memory.

According to one embodiment of the present invention, the data used by the second data processor comprises a second plurality of instructions executable by the second data processor.

According to another embodiment of the present invention, the second data processor further comprises an on-chip memory capable of storing a third plurality of instructions executable by the second data processor.

According to still another embodiment of the present invention, the second processor is capable of controlling the external bus.

According to yet another embodiment of the present invention, the external bus is a peripheral component interconnect (PCI) bus.

According to a further embodiment of the present invention, the second data processor is disposed in a peripheral device associated with the first data processor.

According to a still further embodiment of the present invention, the peripheral device is a communication device and the second data processor is a digital signal processor.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged processing system.

Figure 1:
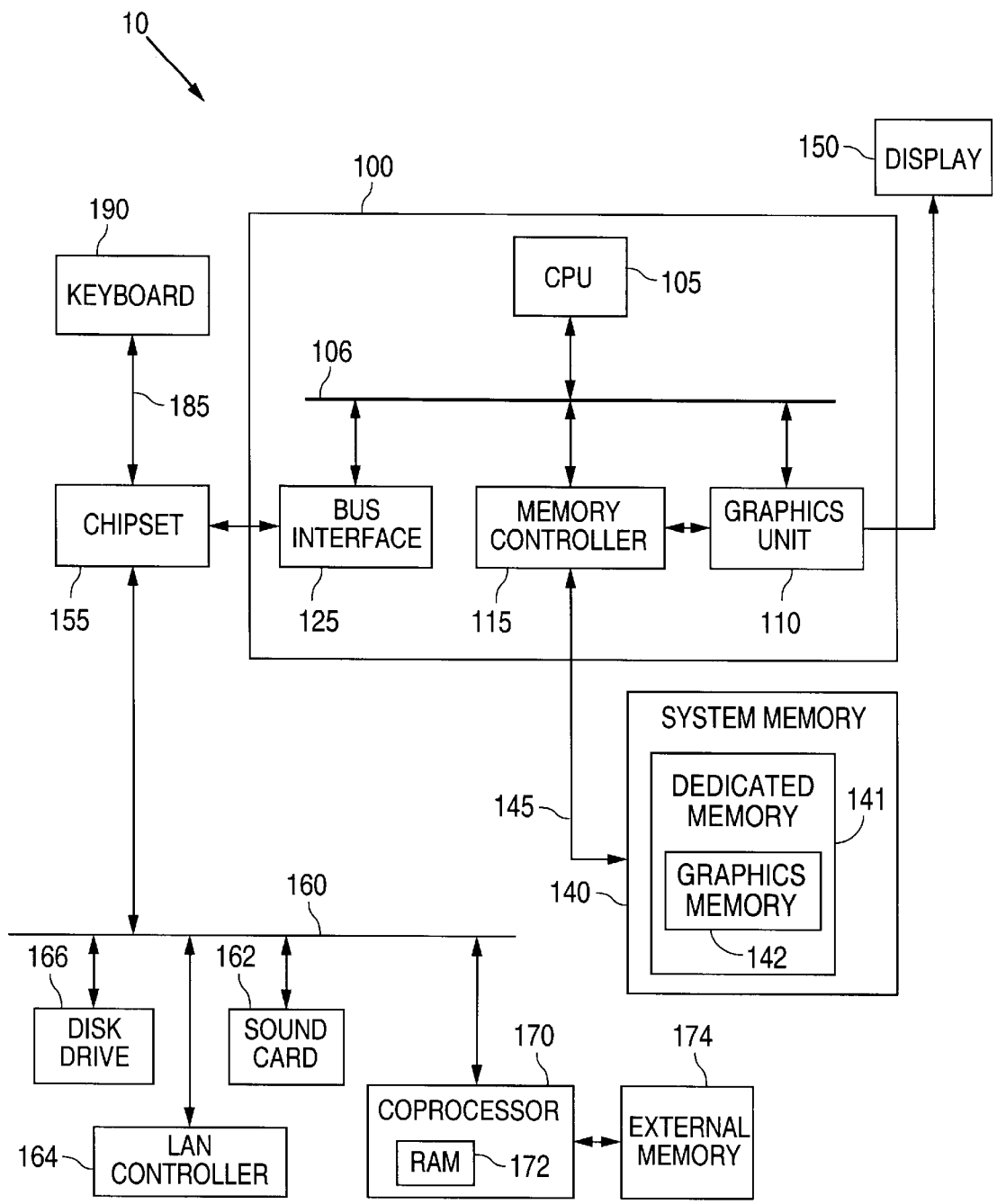
FIG. 1 is a block diagram of a prior art processing system, which includes an integrated microprocessor.

FIG. 1 is a block diagram of prior art processing system 10, which includes integrated microprocessor 100 and external coprocessor 170. Integrated microprocessor 100 comprises central processing unit (CPU) 105, graphics unit 110, system memory controller 115, and bus interface 125, all of which are coupled to communication bus 106. Graphics unit 110 and system memory controller 115 may be integrated onto the same die as microprocessor 100.

Integrated memory controller 115 bridges microprocessor 100 to system memory 140, and may provide data compression and/or decompression to reduce bus traffic over external memory bus 145. Integrated graphics unit 110 may provide one or more of TFT, DSTN, RGB, and other types of video output to drive display 150. Bus interface unit 125 connects integrated microprocessor 100 to chipset bridge 155. Bus interface unit 125 may support the peripheral component interconnect (PCI) bus interface.

Chipset bridge 155 may provide a conventional peripheral component interconnect (PCI) bus interface to PCI bus 160, which connects chipset bridge 155 to one or more peripherals, such as sound card 162, LAN controller 164, disk drive 166, and peripheral processor 170, among others. In some embodiments, chipset bridge 155 may integrate local bus functions such as sound, disk drive control, modem, network adapter, and the like.

Peripheral processor 170 may be anyone of a wide variety of processing devices that may be implemented in processing system 10. For example, peripheral processor 170 may be a digital signal processor (DSP) that provides a capability for communicating with external devices, such as a digital subscriber line (DSL). Alternatively, peripheral processor 170 may be a dedicated microprocessor that performs only a limited set of function(s) and that is subordinate to microprocessor 100. Peripheral processor 170 may also be a microcontroller device or an ASIC circuit that is capable of executing instructions retrieved from a memory.

Typically, peripheral processor 170 requires its own memory to store the code that it executes. If only a small amount of code is executed by peripheral processor 170, then the memory may be a dedicated on-chip random access memory (RAM), such as RAM 172, that is integrated into peripheral processor 170. However, as the size of the executable code used by peripheral processor 170 grows, the use of on-chip RAM 172 becomes impractical. For this reason, peripheral processor 170 typically requires external memory 174 to store instructions and data used by peripheral processor 170. Unfortunately, this increases the amount of memory required by processing system 10. This increases the overall chip count and the number of pins used to interface with memory.

Figure 2:
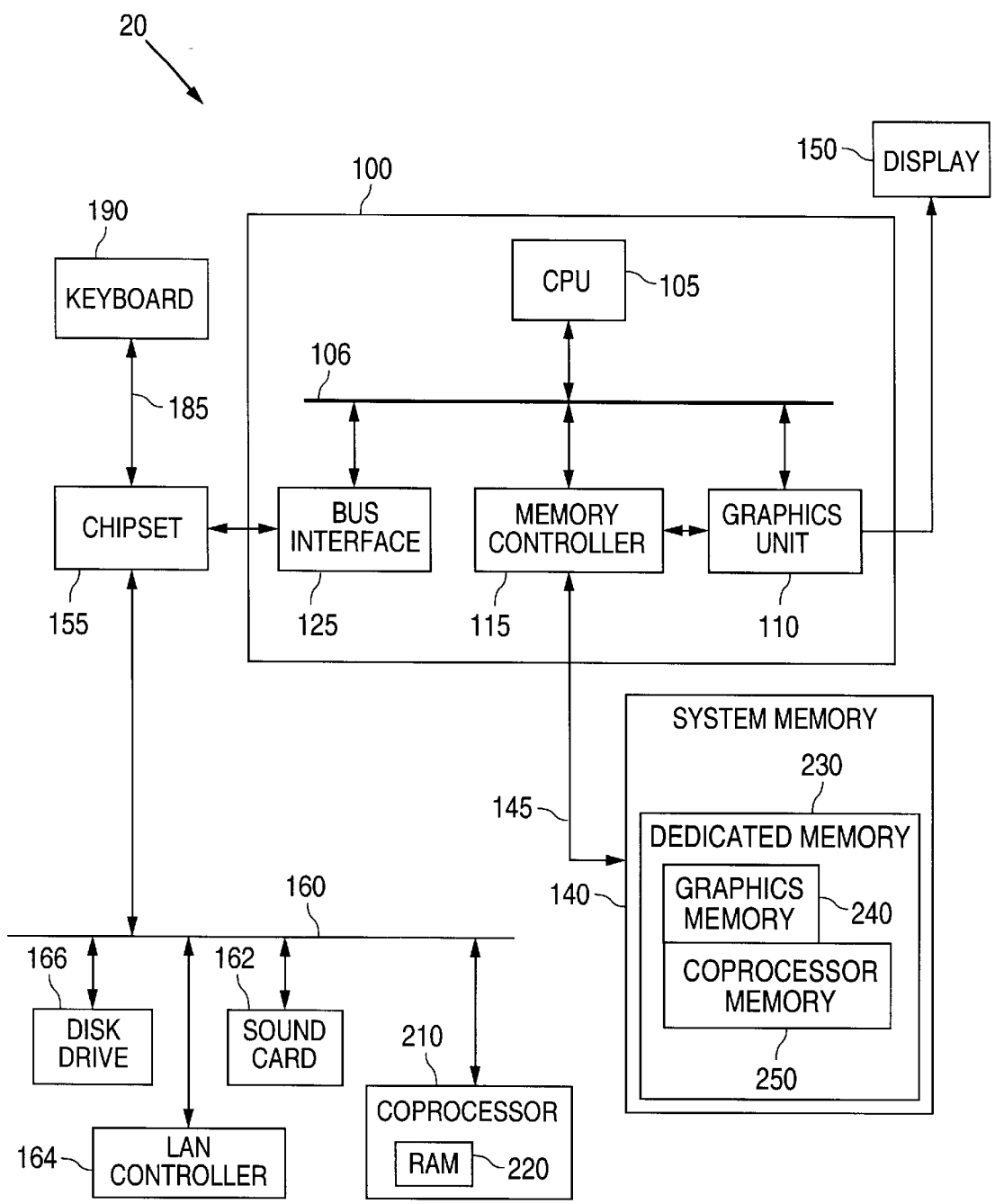
FIG. 2 is a block diagram of a processing system, including an integrated microprocessor and an external coprocessor, according to one embodiment of the present invention.

FIG. 2 is a block diagram of processing system 20, including integrated microprocessor 100, according to one embodiment of the present invention. Processing system 20 is similar in most respects to prior art processing system 10 in FIG. 1. Integrated microprocessor 100 comprises central processing unit (CPU) 105, graphics unit 110, system memory controller 115, and bus interface 125, all of which are coupled to communication bus 106. Graphics unit 110 and system memory controller 115 may be integrated onto the same die as microprocessor 100.

Integrated memory controller 115 bridges microprocessor 100 to system memory 140, and may provide data compression and/or decompression to reduce bus traffic over external memory bus 145. Integrated graphics unit 110 may provide one or more of TFT, DSTN, RGB, and other types of video output to drive display 150. Bus interface unit 125 connects integrated microprocessor 100 to chipset bridge 155. Bus interface unit 125 may support the peripheral component interconnect (PCI) bus interface.

Chipset bridge 155 may provide a conventional peripheral component interconnect (PCI) bus interface to PCI bus 160, which connects chipset bridge 155 to one or more peripherals, such as sound card 162, LAN controller 164, disk drive 166, and peripheral processor 210, among others. In some embodiments, chipset bridge 155 may integrate local bus functions such as sound, disk drive control, modem, network adapter, and the like.

Those skilled in the art will recognize that bus interface unit 125 and memory controller 115 in microprocessor 100 comprise what is frequently referred to as a "north bridge" architecture. Similarly, chipset bridge 155 and PCI bus 160 are frequently referred to as a "south bridge" architecture.

Peripheral processor 210 may be anyone of a wide variety of processing devices that may be implemented in processing system 20. For example, peripheral processor 210 may be a digital signal processor (DSP) that provides a capability for communicating with external devices, such as a digital subscriber line (DSL) Alternatively, peripheral processor 210 may be a general purpose microprocessor that is dedicated to performing only a limited set of function(s) and that is subordinate to microprocessor 100. Peripheral processor 210 may also be a microcontroller, an ASIC chip, a programmable logic array (PAL) chip, or similar device that is capable of executing instructions retrieved from a memory.

As in the case of peripheral processor 170 in prior art processing system 10, peripheral processor 210 also requires memory to store the code executed by peripheral processor 210. Again, if only a small amount of code is executed by peripheral processor 210, then the memory may be a dedicated on-chip random access memory (RAM), such as RAM 220, that is integrated into peripheral processor 210. However, if the size of the executable code used by peripheral processor 210 is large, peripheral processor 210 also requires an external memory to store instructions and data used by peripheral processor 210. Unlike the prior art system, however, peripheral processor 210 uses the same memory, namely system memory 140, used by microprocessor 100, to store data and instruction code used by peripheral processor 210. This decreases the amount of memory required by processing system 20 and reduces the overall chip count and the number of pins used to access memory.

In an advantageous embodiment of the present invention, bus interface unit 125 is implemented as a unified memory architecture (UMA) design and at least a portion of system memory 140 comprises dedicated memory 230. Dedicated memory 230 comprises graphics memory 240. In prior art processing system 10, dedicated memory 141 typically is used by graphics unit 110 to hold graphics data and instruction code, represented collectively as graphics memory 142 in dedicated memory 141. In accordance with an advantageous embodiment of the present invention, the instructions and data used by peripheral processor 210, represented collectively as peripheral processor memory 250, are also stored in dedicated memory 230. The use of dedicated memory 230 allows the code and data in peripheral processor memory 250 used by peripheral processor 210 to be accessed without the need for page tables. In other words, the instruction code and data in peripheral processor memory 250 is always in dedicated memory 230 at the same physical address.

In order to use system memory 140 to store and to retrieve data and instruction code that it needs, peripheral processor 210 takes advantages of the features of the PCI Local Bus Specification followed by chipset bridge 155. The PCI bus standard describes the way that peripherals on PCI bus 160 are electrically connected and the structured and controlled manner in which those peripherals must behave. Specifically, peripheral processor 210 uses the "bus mastering" capability of the PCI bus standard. Bus mastering allows peripheral processor 210, or any other device on PCI bus 160, to take control of PCI bus 160 and perform transfers directly, without requiring CPU 105 to act a "middle man" for any data transfers. The bus mastering capability is facilitated by chipset bridge 155, which arbitrates requests to take control of PCI bus 160 from the peripherals attached to PCI bus 160.

When peripheral processor 210 takes control of PCI bus 160, peripheral processor 210 can directly access peripheral processor memory 250 via the unified memory architecture (UMA) provided by bus interface unit 125 without requiring any action by CPU 105. In a non-UMA system, data must be transferred between graphics, video and imaging memory located on separate memory boards. In a UMA design, main (or system) memory used by CPU 105, frame buffer, z-buffer, texture memory, rendering memory, image memory, video memory are all implemented in system memory 140. Bus interface unit 125 arbitrates memory requests from the different subsystems in processing system 20, including CPU 105, graphics unit 110, and chipset bridge 155. Thus, each one of CPU 105, graphics unit 110, and chipset bridge 155 has direct access to the contents of system memory 140. Bus interface unit 125 is capable of automatically reallocating memory space in system memory 140 according to the relative needs of CPU 105, graphics unit 110, chipset bridge 155, and other devices.

Figure 3:
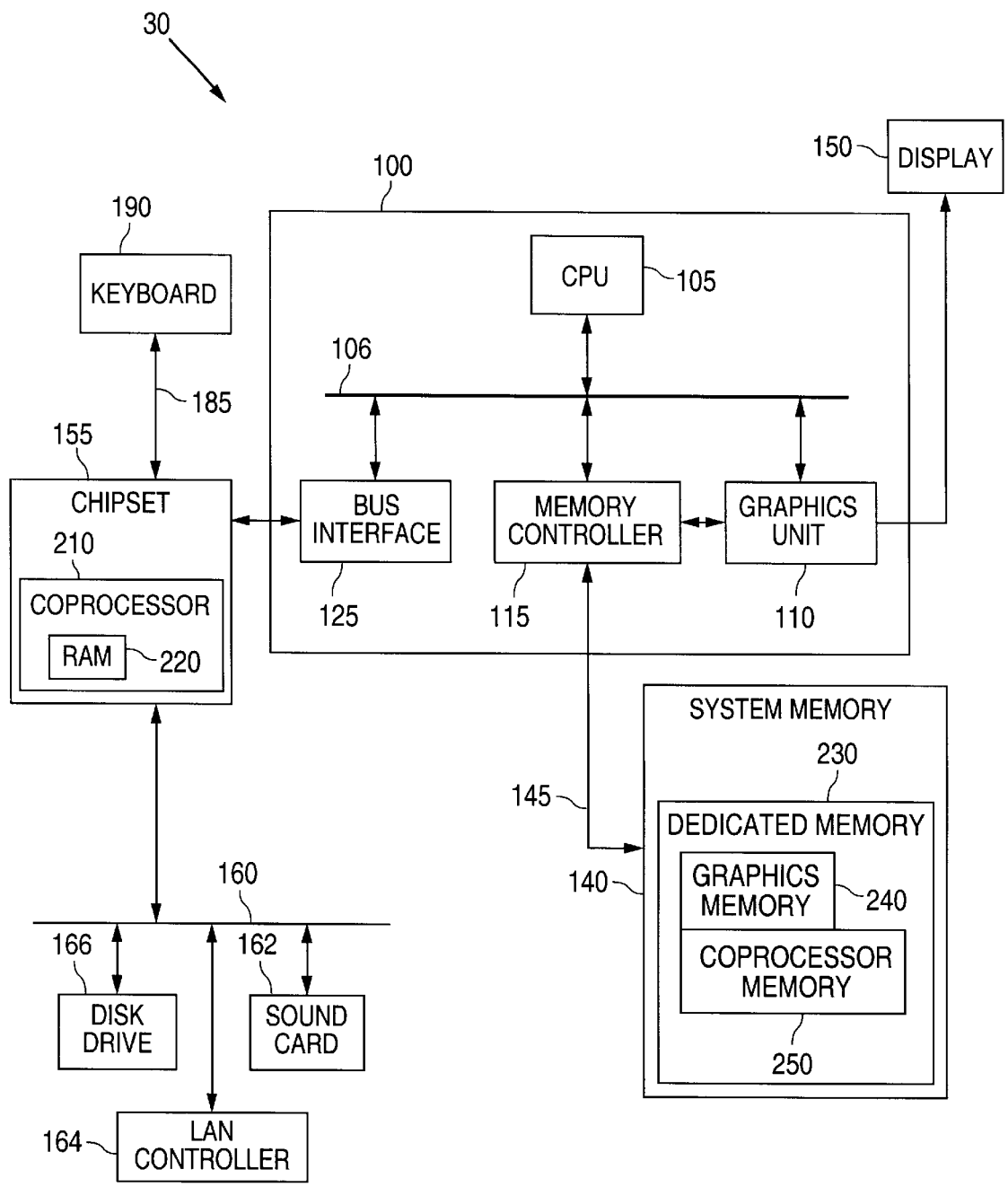
FIG. 3 is a block diagram of a processing system, including an integrated microprocessor and an external coprocessor, according to an alternate embodiment of the present invention.

FIG. 3 is a block diagram of processing system 30, including integrated microprocessor 100 and external coprocessor 210, according to an alternate embodiment of the present invention. The operation of processing system 30 is similar in nearly all respects to the operation of processing system 20 in FIG. 2. However, in processing system 30, coprocessor 210 is implemented in chipset bridge 155. In this type of configuration, coprocessor 210 may be an integral part of chipset bridge 155 that controls its operation. Alternatively, coprocessor 210 may be a distinct PCI device that is incorporated into chipset bridge 155 in order to save board space. Nonetheless, the operation of coprocessor 210 in FIG. 3 is substantially the same as the operation of coprocessor 210 in FIG. 2.

Figure 4:
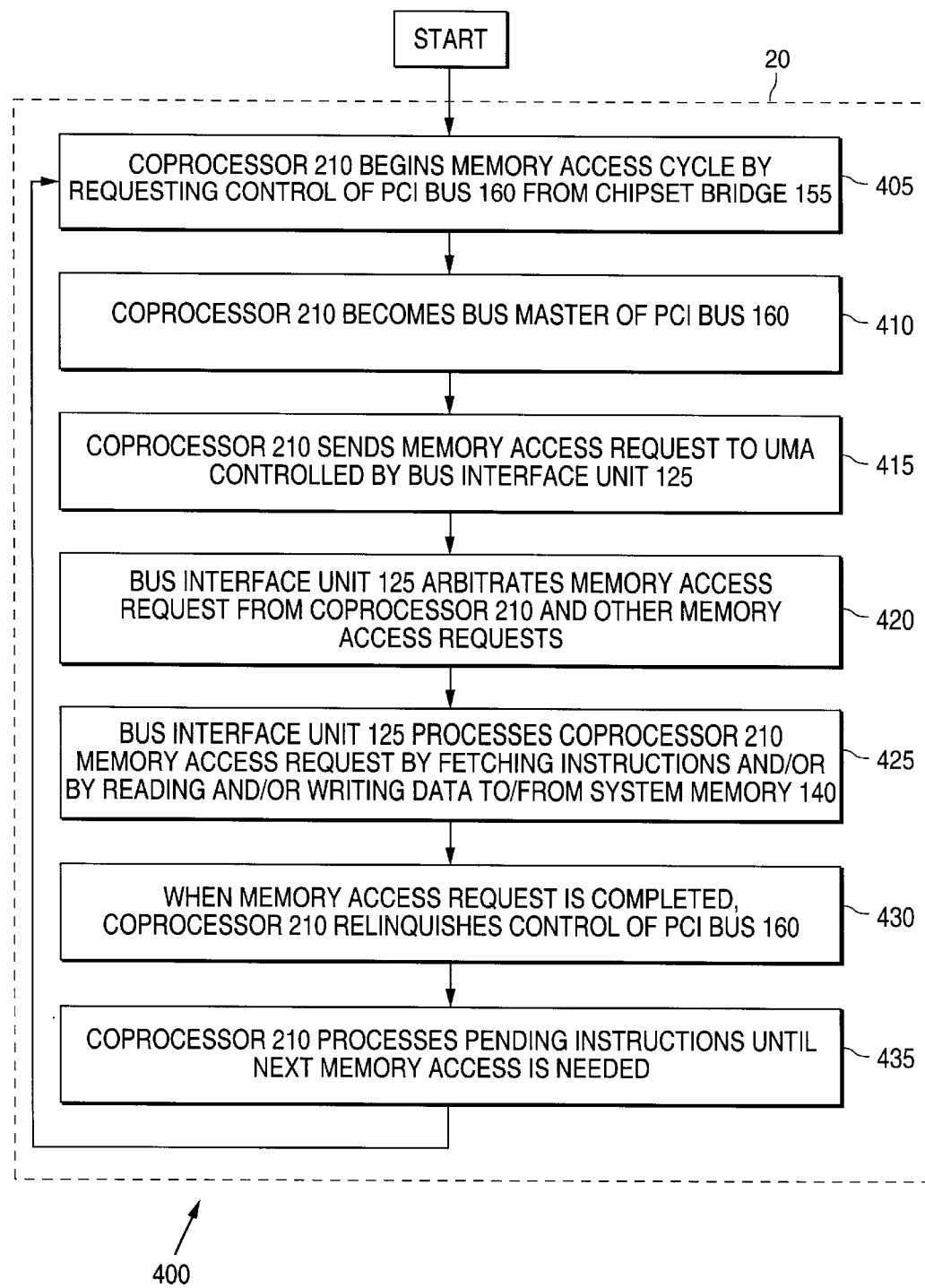
FIG. 4 is a flow diagram illustrating the operation of the processing system in FIG. 2, according to one embodiment of the present invention.

FIG. 4 depicts flow diagram 400, which illustrates the operation of processing system 20, according to one embodiment of the present invention. Initially, peripheral processor 210 must make an access to system memory 140 in order to fetch instruction(s), to read data, to write data, or to perform some combination of these operations. Peripheral processor 210 begins a memory access cycle by requesting control of PCI bus 160 (i.e., bus master request) from chipset bridge 155 (process step 405). After chipset bridge 155 receives the request and arbitrates it with any other such requests, peripheral processor 210 becomes the bus master of PCI bus 160 (process step 410).

Next, peripheral processor 210 sends a memory access request through chipset bridge 155 and an I/O interface (not shown) to the unified memory architecture controlled by bus interface unit 125 (process step 415). Bus interface unit 125 arbitrates the memory access request received from peripheral processor 210 with any other pending memory access requests that may have been received from CPU 105 or any other device in processing system 20 (process step 420). Then, bus interface unit 125 processes the peripheral processor 210 memory access request by 1) fetching instructions from system memory 140, 2) reading data from system memory 140, or 3) writing data to system memory 140, or some combination of two or more of these operations (process step 425).

When the memory access request is completed, peripheral processor 210 relinquishes control over PCI bus 160 and chipset bridge 155 again is bus master of PCI bus 160 (process step 430). Next, peripheral processor 210 processes any pending instructions, including instructions fetched during the memory access cycle, until the next memory access is needed (process step 435). Peripheral processor 210 then returns to process step 405 to begin the next memory access cycle.

Generally speaking, the memory access performed by coprocessor 210 into system memory 140 will be slower than the memory access performed by the prior art coprocessor 170 (which uses dedicated external memory 174). Therefore, on-chip RAM 220 should be designed to be large enough to contain the "inner loops" of performance-critical code. On-chip RAM 220 may also be used by coprocessor 210 to temporarily store intermediate calculation values during fast data manipulations before returning a final block of data to coprocessor memory 250.

Although the foregoing text described an embodiment of the present invention in which peripheral processor 210 is coupled to the unified memory architecture of microprocessor 100 by means of a PCI bus, those skilled in the art will understand that this is by way of illustration only. The PCI embodiment described above should not be construed so as to limit the scope of the present invention in any way. In fact, peripheral processor 210 may be coupled to the unified memory architecture of microprocessor 100 by means of any external bus that may be controlled (or mastered) by a peripheral device coupled to that external bus.

Although the present invention has been described it detail, those skilled in the art should understand that they can make various changes, substitutions and alterations herein without departing from the spirit and scope of the invention in its broadest form.

What is claimed is:

1. A processing system comprising:
   a first data processor comprising a unified memory architecture capable of receiving memory access requests from an external bus coupled to said first data processor;
   a first processor memory coupled to said first data processor and controlled by said unified memory architecture, said first processor memory capable of storing a first plurality of instructions executable by said first data processor, wherein said first processor memory comprises a portion of memory that comprises a dedicated memory that comprises a peripheral processor memory; and
   a second data processor coupled to said external bus and capable of sending said memory access requests to said first data processor, wherein said memory access requests from said second data processor access data used by said second data processor stored in said peripheral processor memory of said first processor memory that is dedicated to said second data processor.

2. The processing system as set forth in claim 1 wherein said data used by said second data processor comprises a second plurality of instructions executable by said second data processor.

3. The processing system as set forth in claim 2 wherein said second data processor further comprises an on-chip memory capable of storing a third plurality of instructions executable by said second data processor.

4. The processing system as set forth in claim 1 wherein said second processor is capable of controlling said external bus.

5. The processing system as set forth in claim 4 wherein said external bus is a peripheral component interconnect (PCI) bus.

6. The processing system as set forth in claim 5 wherein said second data processor is disposed in a peripheral device associated with said first data processor.

7. The processing system as set forth in claim 6 wherein said peripheral device is a communication device and said second data processor is a digital signal processor.

8. The processing system as set forth in claim 1 wherein data and instruction code that is used by said second data processor is stored in said peripheral processor memory of said first processor memory wherein said second data processor accesses said data and instruction code without using page tables.

9. For use with a first data processor comprising a unified memory architecture capable of receiving memory access requests from an external bus coupled to said first data processor and a first processor memory coupled to said first data processor and controlled by said unified memory architecture, wherein said first processor memory comprises a portion of memory that comprises a dedicated memory that comprises a peripheral processor memory, a second data processor coupled to said external bus and capable of sending said memory access requests to said first data processor, wherein said memory access requests from said second data processor access data used by said second data processor stored in said peripheral processor memory of said first processor memory that is dedicated to said second data processor.

10. The second data processor as set forth in claim 9 wherein said data used by said second data processor comprises a first plurality of instructions executable by said second data processor.

11. The second data processor as set forth in claim 10 wherein said second data processor further comprises an on-chip memory capable of storing a second plurality of instructions executable by said second data processor.

12. The second data processor as set forth in claim 9 wherein said second data processor is capable of controlling said external bus.

13. The second data processor as set forth in claim 12 wherein said external bus is a peripheral component interconnect (PCI) bus.

14. The second data processor as set forth in claim 13 wherein said second data processor is disposed in a peripheral device associated with said first data processor.

15. The second data processor as set forth in claim 14 wherein said peripheral device is a communication device and said second data processor is a digital signal processor.

16. The processing system as set forth in claim 9 wherein data and instruction code that is used by said second data processor is stored in said peripheral processor memory of said first processor memory wherein said second data processor accesses said data and instruction code without using page tables.

17. For use with a first data processor comprising a unified memory architecture capable of receiving memory access requests from an external bus coupled to the first data processor and a first processor memory coupled to the first data processor and controlled by the unified memory architecture, said first processor memory capable of storing a first plurality of instructions executable by said first data processor, wherein said first processor memory comprises a portion of memory that comprises a dedicated memory that comprises a peripheral processor memory;

a method performed by a second data processor coupled to the external bus for accessing the peripheral processor memory comprising the steps of:
assuming control of the external bus;
transmitting memory access requests to the unified memory architecture in the first data processor via the external bus; and
accessing data used by the second data processor stored in said peripheral processor memory of said first processor memory that is dedicated to said second data processor.

18. The method as set forth in claim 17 wherein the data used by the second data processor comprises a first plurality of instructions executable by the second data processor.

19. The method as set forth in claim 17 wherein the external bus is a peripheral component interconnect (PCI) bus.

20. The method as set forth in claim 19 wherein the second data processor is disposed in a peripheral device associated with the first data processor.

21. The method as set forth in claim 20 wherein the peripheral device is a communication device and the second data processor is a digital signal processor.

22. The method as set forth in claim 17 wherein data and instruction code that is used by said second data processor is stored in said peripheral processor memory of said first processor memory wherein said second data processor accesses said data and instruction code without using page tables.

* * * * *